ured to
UNITED STATES PATENT OFFICE.

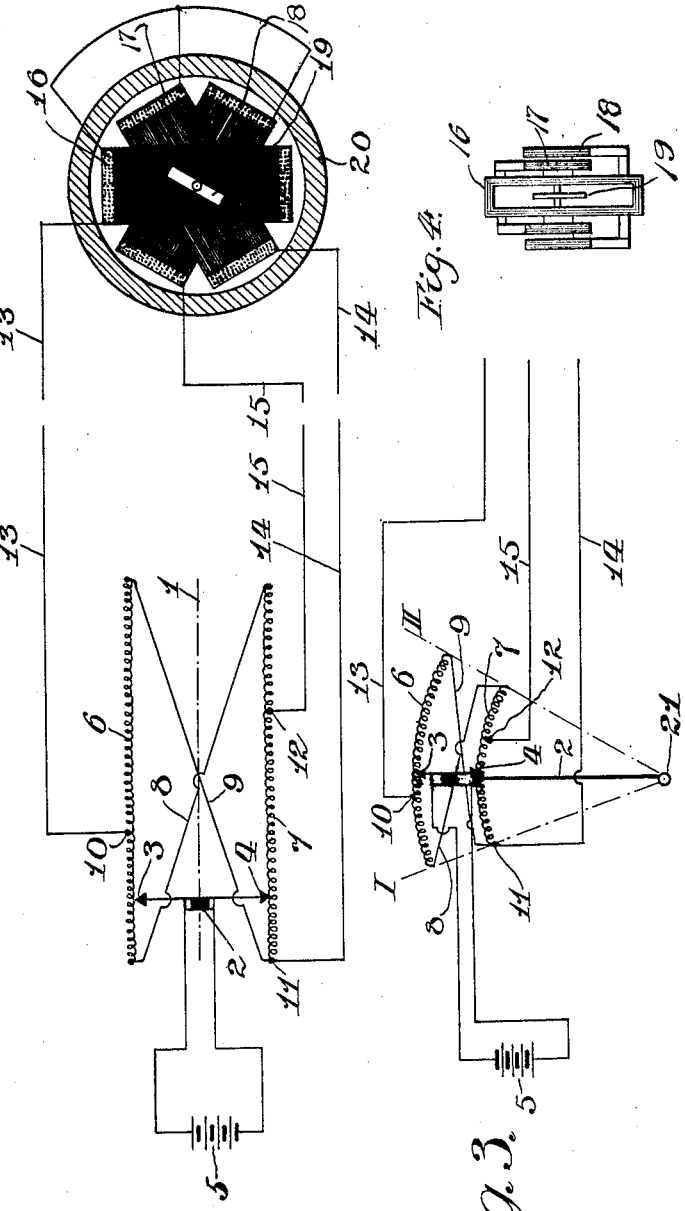

OLOF ARVID AXELSSON TENOW AND ERIK GUSTAF AHNSTROM, OF STOCKHOLM, SWEDEN.

ELECTRIC TRANSMITTING SYSTEM.

1,261,870.  Specification of Letters Patent.  Patented Apr. 9, 1918.

Application filed December 29, 1916. Serial No. 139,668.

*To all whom it may concern:*

Be it known that we, OLOF ARVID AXELSSON TENOW and ERIK GUSTAF AHNSTROM, subjects of the King of Sweden, and both residents of Stockholm, Sweden, have invented new and useful Improvements in Electric Transmitting Systems, of which the following is a specification.

This invention relates to an electric transmitting system for indicating at a distance the movements of an apparatus.

It is well-known to transmit at a distance the movements of a rotatable body, as for instance the deflections of a pointer, by means of electric currents. In this case the rotatable body is provided with two contacts touching diametrically opposite points of an annular resistance concentric with the axis of rotation of said body, and each of the contacts is connected with a pole of a source of current, while the said resistance is provided with a plurality of contacts connected by means of connecting wires with stationary electric coils in a receiver located at a distance. Further, the coils are disposed in correspondence with the said contacts and serve to generate a rotatable magnetic field, in which a magnet or rotatable coil adjusting itself to the direction of the field, is provided.

In this case, the magnet or the rotatable coil will move synchronously to the rotatable member of the transmitter, and, consequently, a certain rotation of the latter will effect an equal rotation of the magnet or the rotatable coil. Therefore, such a device is adapted to indicate at a distance the movements of a member having a relatively great angular oscillating or rotating movement.

If, on the contrary, the question is to actuate at a distance a pointer mechanism in correspondence with the movements of a body having either a straight-lined movement or a relatively small angular rotating movement, the device described above is unsuitable. If the body, the movements of which are to be indicated at a distance, has a straight-lined movement, a mechanical tranmission is to be interposed between said body and a rotatable carrier supporting the contacts of the transmitter. This will, however, cause sources of error owing to inevitable lost motions of said transmission. If, on the other hand, the said body has a small angular rotating movement, the rotation of the movable member of the receiver, when using the device described above, will frequently be so small that an exact transmission of the movement will be impossible.

The object of this invention is to obviate the said inconveniences by providing electric transmitting means adapted to actuate at a distance, without the use of mechanical transmissions in the transmitter, a rotatable pointer in correspondence with the movements of a body having a straight-lined movement or to cause such a pointer to indicate on a larger scale, the movements of a rotatable body.

To attain these objects the body, whose movements are to be indicated at a distance, is provided with two contacts each of which is connected with a pole of a source of continuous current and is caused to touch an electric resistance, said resistances being parallel to the direction of movement of the movable body and the ends of the resistances being crosswise connected, while several points of the resistances located at equal distance apart are each connected, by means of conducting wires, with an electric coil, which coils are located at a distance and disposed symmetrically about a rotatable magnet or coil.

A specific embodiment of the invention is illustrated in the accompanying drawing in which—

Figure 1 is a diagram showing a transmitter with a member having straight-lined movement. Fig. 2 is a diagrammatic section of a receiver, and Fig. 3 is a diagram showing a transmitter with a member having a small angular rotating movement. Fig. 4 shows a diagrammatic vertical cross-section through the coils 16, 17 and 18.

Referring to Fig. 1, 1 designates the path of movement of a body having a straight-lined movement to and fro and whose movements are to be indicated at a distance. In the drawing the said body is represented by a block 2. 3 and 4 are two contacts secured to the body 2 and insulated from each other, each of said contacts being connected with a pole of a source of continuous current 5. Each of the two contacts touches an electric resistance 6 and 7 respectively, said resistances being parallel to the path of movement 1 and interconnected crosswise at the ends by means of conducting wires 8 and 9. Three points 10, 11 and 12 of the resistances located at equal distances apart are connected by means of conducting wires 13, 14 and 15 respectively with a stationary electric coil 16, 17 and 18 respectively, said coils being disposed in the receiver, and connected together as shown in Fig. 2, which is located at a distance.

The three coils 16, 17 and 18 are disposed symmetrically, i. e. displaced 120°, about an easily movable armature such as a magnet 19 and, preferably, wound on frames so shaped, that the coils may be placed inside each other thus forming a compact design of the coil complex. In order to insulate the magnet 19 from outer magnetic influence, the coils are surrounded by a closed iron ring 20.

When a current passes the coils 16, 17 and 18 a magnetic field is generated, the resulting direction of which depends on the relation between the strength of current of the different coils, said relation depending in turn on the varying position of the points, at which the source of current 5 is connected with the two resistances 6 and 7. According as the position of said points is changed, owing to the movements of the body 2, the said relation as well as the direction of the rotatable field generated by the coils 16, 17 and 18 are changed. On account of the symmetric position of the points 10, 11 and 12 and of the coils 16, 17 and 18 it is attained, that a certain straight-lined movement of the body 2 corresponds to a certain rotation of the field generated by the said coils and to a corresponding rotation of the magnet 19. The coil 19 may be provided with a pointer indicating on a suitable dial the temporary position of said magnet.

In the transmitter shown in Fig. 3 the body 2, whose movements are to be indicated at a distance, is rotatable about a journal 21 within the angle indicated by the lines I and II. The body 2 is, as in the construction described above, provided with two contacts 3 and 4, each of which is connected with a pole of the source of current 5. Each of the contacts touches a resistance 6 and 7 respectively, said resistances being concentric with the journal 21 and their ends connected crosswise. Besides, the resistances are provided with three contacts 10, 11 and 12 situated at equal distances apart and each connected, by means of a connecting wire 13, 14 and 15 respectively, with a receiver (not shown) of the type illustrated in Fig. 2.

The manner of operation of this apparatus is analogous to that of the apparatus shown in Fig. 1. A movement of the body between the positions I and II corresponds to one revolution of the movable coil of the receiver. Consequently, the receiver indicates the movement of the transmitter on a larger scale.

Having now particularly described and ascertained the nature of our said invention and in what manner the same is to be performed, we declare that what we claim is:

1. In an electric transmitting system, the combination of a transmitter comprising a body movable to and fro, contacts secured to said body, a source of continuous current, each pole of which is connected with one of said contacts, electric resistances parallel to the direction of movement of said body, each of said resistances being touched by one of said contacts and the ends of the resistances being crosswise connected, a receiver comprising stationary electric coils located symmetrically about a movable armature, and conducting wires connecting each of said stationary coils with a point of said resistances, said points being located at equal distances apart.

2. In an electric transmitting system, the combination of a transmitter comprising a body movable to and fro, contacts secured to said body, a source of continuous current, each pole of which is connected with one of said contacts, electric resistances parallel to the direction of movement of said body, each of said resistances being touched by one of said contacts and the ends of the resistances being crosswise connected, a receiver comprising stationary electric coils placed inside each other and located symmetrically about a movable armature, and conducting wires connecting each of said stationary coils with a point of said resistances, said points being located at equal distances apart.

In testimony whereof we have signed our names.

OLOF ARVID AXELSSON TENOW.
ERIC GUSTAF AHNSTROM.